United States Patent
Jankovic et al.

(10) Patent No.: US 9,382,861 B2
(45) Date of Patent: Jul. 5, 2016

(54) HUMIDITY SENSOR DIAGNOSTICS

(71) Applicant: Ford Global Technologies, LLC, Dearborn, MI (US)

(72) Inventors: Mrdjan J. Jankovic, Birmingham, MI (US); Timothy Joseph Clark, Livonia, MI (US); Imad Hassan Makki, Dearborn Heights, MI (US); Ross Dykstra Pursifull, Dearborn, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 575 days.

(21) Appl. No.: 13/774,234

(22) Filed: Feb. 22, 2013

(65) Prior Publication Data

US 2014/0238369 A1     Aug. 28, 2014

(51) Int. Cl.
*F02D 41/22*     (2006.01)
*F02D 41/14*     (2006.01)
*F02D 41/00*     (2006.01)

(52) U.S. Cl.
CPC ............. *F02D 41/222* (2013.01); *F02D 41/005* (2013.01); *F02D 41/144* (2013.01); *F02D 41/1454* (2013.01); *F02D 2200/0418* (2013.01); *Y02T 10/47* (2013.01)

(58) Field of Classification Search
CPC ...................................................... F02M 25/07
See application file for complete search history.

(56) References Cited

U.S. PATENT DOCUMENTS

| | | | | |
|---|---|---|---|---|
| 5,617,337 A * | 4/1997 | Eidler | ................... | F02D 41/222 |
| | | | | 123/478 |
| 6,073,480 A * | 6/2000 | Gokhfeld | ............. | G01N 27/124 |
| | | | | 73/29.02 |
| 6,257,214 B1* | 7/2001 | Bidner | ................ | F02D 41/0055 |
| | | | | 123/568.16 |
| 6,581,370 B2* | 6/2003 | Sato | ...................... | F01N 3/0835 |
| | | | | 123/688 |
| 6,655,200 B2* | 12/2003 | Osaki | ...................... | F02D 21/08 |
| | | | | 73/114.25 |
| 6,823,268 B2* | 11/2004 | Silvis | ................... | G01F 25/0053 |
| | | | | 702/30 |
| 7,251,555 B2* | 7/2007 | Kimura | ................... | F02M 26/48 |
| | | | | 123/568.12 |
| 7,292,929 B2* | 11/2007 | Durand | ................ | F02D 41/005 |
| | | | | 123/568.21 |

(Continued)

FOREIGN PATENT DOCUMENTS

DE     19831748 A1     1/2000
DE     10216278 A1     11/2003

(Continued)

OTHER PUBLICATIONS

Yacoub, Yasser Mohamed sayed et al., "Indirect Measurement of Relative Air Humidity," U.S. Appl. No. 13/934,150, filed Jul. 2, 2013, 25 pages.

(Continued)

*Primary Examiner* — Jonathan M Dager
(74) *Attorney, Agent, or Firm* — Julia Voutyras; Alleman Hall McCoy Russell & Tuttle LLP

(57) ABSTRACT

Embodiments for testing a humidity sensor are provided. One example method comprises indicating degradation of a humidity sensor based on a humidity sensor output and output from an intake gas composition sensor. In this way, output from the intake gas composition sensor may be used to determine if the humidity sensor is degraded.

18 Claims, 3 Drawing Sheets

(56) References Cited

U.S. PATENT DOCUMENTS

| | | | | |
|---|---|---|---|---|
| 7,389,771 B2* | 6/2008 | Andrews | F02D 41/0052 | 123/568.22 |
| 7,565,901 B2* | 7/2009 | Furuta | F02B 47/08 | 123/568.16 |
| 7,715,976 B1* | 5/2010 | Xiao | F02M 26/46 | 123/406.48 |
| 8,726,658 B2* | 5/2014 | Styles | F02B 37/12 | 123/562 |
| 9,151,207 B2* | 10/2015 | Makki | F02D 41/1495 | |
| 2003/0046979 A1* | 3/2003 | Yamazaki | F01N 3/0835 | 73/29.02 |
| 2003/0106304 A1* | 6/2003 | Miyahara | F02D 41/222 | 60/277 |
| 2003/0136390 A1* | 7/2003 | Ramamurthy | F02D 41/005 | 123/568.22 |
| 2004/0139797 A1* | 7/2004 | Ueno | F01N 13/009 | 73/114.73 |
| 2004/0168509 A1* | 9/2004 | Takakura | F01N 3/0814 | 73/114.77 |
| 2004/0231322 A1* | 11/2004 | Miyahara | F01N 3/0807 | 60/277 |
| 2004/0237508 A1* | 12/2004 | Yamazaki | F01N 3/0835 | 60/277 |
| 2005/0021218 A1* | 1/2005 | Bhargava | F02D 41/0007 | 701/108 |
| 2005/0072389 A1* | 4/2005 | Cullen | F01L 1/022 | 123/90.15 |
| 2005/0072404 A1* | 4/2005 | Cullen | F02D 41/1475 | 123/399 |
| 2005/0072406 A1* | 4/2005 | Cullen | F01L 1/34 | 123/494 |
| 2005/0072411 A1* | 4/2005 | Cullen | F02D 41/222 | 123/690 |
| 2006/0037404 A1* | 2/2006 | Watanabe | G01N 27/223 | 73/714 |
| 2007/0095328 A1* | 5/2007 | Brehob | F02D 41/005 | 123/406.47 |
| 2008/0059049 A1* | 3/2008 | Totten | F02D 41/005 | 701/105 |
| 2008/0189009 A1* | 8/2008 | Wang | G01R 31/2829 | 701/31.1 |
| 2009/0254245 A1* | 10/2009 | Bauerle | F02D 41/222 | 701/29.2 |
| 2010/0236532 A1* | 9/2010 | Xiao | F02D 41/146 | 123/677 |
| 2011/0023855 A1* | 2/2011 | Van Nieuwstadt | F01N 3/208 | 123/703 |
| 2012/0227714 A1* | 9/2012 | Surnilla | F02D 41/005 | 123/568.19 |
| 2012/0227719 A1* | 9/2012 | Surnilla | F02D 41/0245 | 123/676 |
| 2013/0024091 A1* | 1/2013 | Yun | F02D 41/0057 | 701/103 |
| 2013/0073179 A1* | 3/2013 | Song | F02D 41/0072 | 701/102 |
| 2013/0118232 A1* | 5/2013 | Auckenthaler | G01N 19/10 | 73/29.02 |
| 2013/0191008 A1* | 7/2013 | Surnilla | F02D 41/0042 | 701/104 |
| 2013/0332050 A1* | 12/2013 | Song | F02D 41/144 | 701/104 |
| 2013/0333677 A1* | 12/2013 | Surnilla | F02D 41/0025 | 123/674 |
| 2014/0109871 A1* | 4/2014 | Glugla | F02B 29/0468 | 123/406.19 |
| 2014/0156172 A1* | 6/2014 | Surnilla | F01N 11/00 | 701/104 |
| 2014/0202437 A1* | 7/2014 | Surnilla | F02D 41/0055 | 123/568.22 |
| 2014/0238348 A1* | 8/2014 | Pursifull | F02M 25/0221 | 123/434 |
| 2014/0238370 A1* | 8/2014 | Pursifull | F02D 41/005 | 123/690 |
| 2014/0298880 A1* | 10/2014 | Pursifull | G01N 33/0006 | 73/1.06 |
| 2014/0316672 A1* | 10/2014 | Uhrich | F02P 5/045 | 701/102 |
| 2014/0316676 A1* | 10/2014 | Pursifull | F02P 5/045 | 701/103 |
| 2014/0338644 A1* | 11/2014 | MacNeille | F02D 37/02 | 123/568.22 |
| 2015/0083081 A1* | 3/2015 | Surnilla | F02M 25/0704 | 123/406.48 |
| 2015/0354489 A1* | 12/2015 | Surnilla | F02D 41/005 | 60/614 |

FOREIGN PATENT DOCUMENTS

| | | |
|---|---|---|
| DE | 102006058880 A1 | 7/2008 |
| DE | 102007053719 B3 | 6/2009 |
| DE | 102010027882 A1 | 10/2011 |

OTHER PUBLICATIONS

Pursifull R., et al., "Humidity Sensor Diagnostics," U.S. Appl. No. 13/774,319, filed Feb. 22, 2013, 46 pages.

Pursifull R., et al., "Humidity Sensor Diagnostics," U.S. Appl. No. 13/774,282, filed Feb. 22, 2013, 48 pages.

* cited by examiner

US 9,382,861 B2

HUMIDITY SENSOR DIAGNOSTICS

FIELD

The present disclosure relates to an internal combustion engine.

BACKGROUND AND SUMMARY

Engine systems may be configured with exhaust gas recirculation (EGR) systems via which at least a portion of the exhaust gas is recirculated to the engine intake. Various sensors may be coupled in the engine system to estimate the amount of EGR being delivered to the engine. These may include, for example, flow rate, various temperature, pressure, oxygen, and humidity sensors. Since the accuracy of the EGR estimation relies on the correct functioning of the various sensors, periodic sensor diagnostics are used.

However, humidity frequently remains constant over the course of a drive cycle. If humidity does change, it can be hard to determine if the humidity changed due to a change in temperature, the presence of rain, a car wash, or if the change is due to sensor degradation. Thus, performing a rationality check to test humidity sensor function may be difficult.

One example approach for diagnosing a humidity sensor is illustrated by Xiao et al. in U.S. Pat. No. 7,715,976. Therein, humidity sensor degradation is determined based on a comparison of an intake humidity estimated by a first humidity sensor in the intake manifold with an exhaust humidity estimated by a second humidity sensor in the exhaust manifold and an ambient humidity estimated by a third humidity sensor located outside of the engine. The sensor readings are compared during conditions when all the sensor readings are expected to be substantially equal, such as during engine non-fueling conditions in which the EGR valve is closed. If the readings of the three humidity sensors differ by more than a threshold, humidity sensor degradation may be determined.

The inventors herein have identified a potential issue with such an approach. The accuracy of determining degradation of any one humidity sensor may depend on the proper functioning of the other humidity sensors. Further, multiple humidity sensors may not be needed for engine control, and thus additional humidity sensors may not be available for comparison.

Accordingly, embodiments for diagnosing a humidity sensor based on correlation to output from an intake gas composition sensor are provided. One example method comprises indicating degradation of a humidity sensor based on a humidity sensor output and output from an intake gas sensor.

In this way, output from the intake gas composition sensor may be used to determine if the humidity sensor is degraded. For example, during selected conditions, when humidity of the intake air entering an engine increases, the oxygen concentration of the air decreases. This is because the water vapor displaces air in the volume of intake air entering the engine, thus lowering the oxygen concentration of the intake air. If the humidity sensor detects an increase in humidity and the intake gas composition sensor does not detect a corresponding decrease in intake air oxygen concentration, the humidity sensor may be erroneously determining that the humidity has changed, and thus degradation of the humidity sensor may be indicated.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
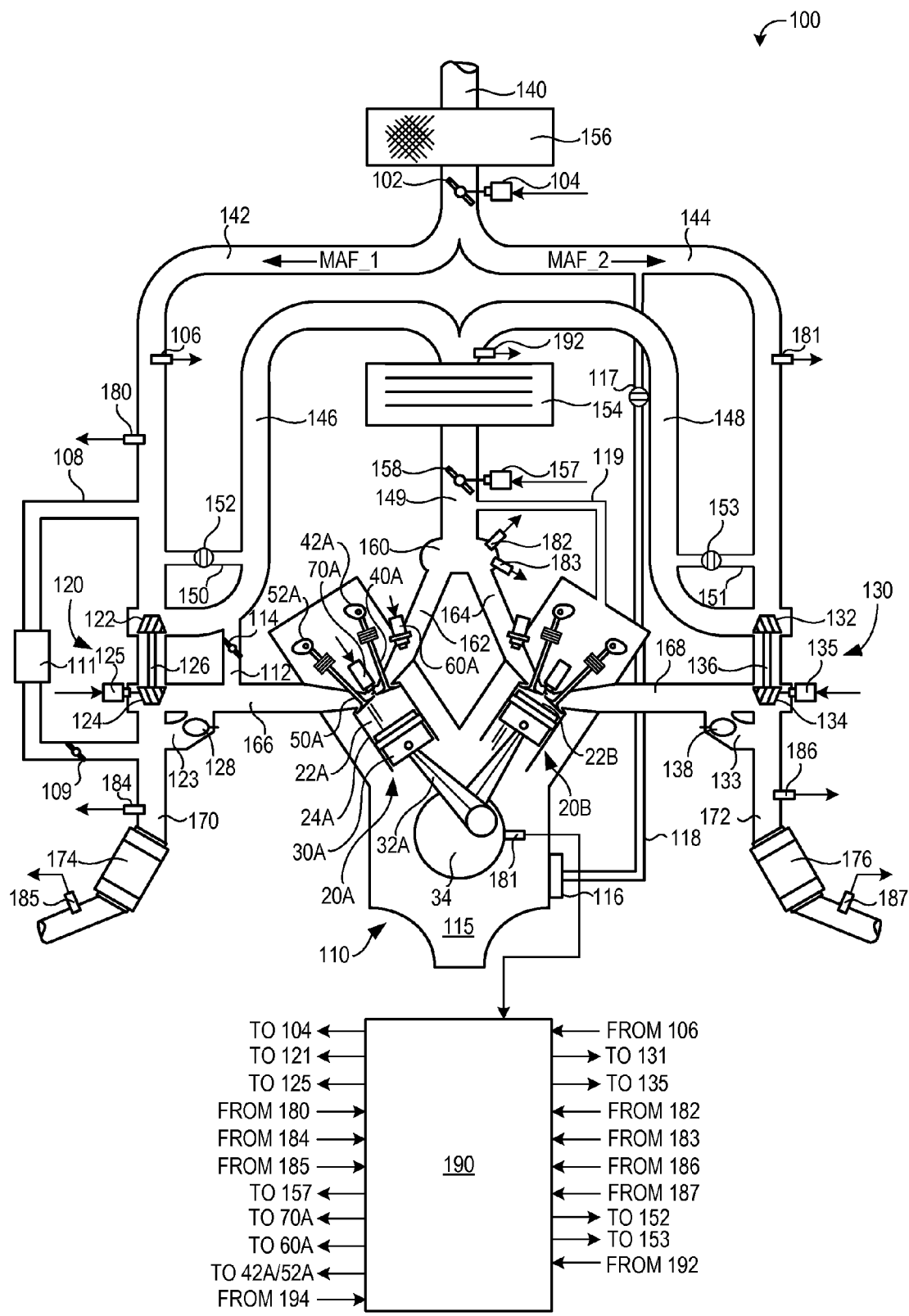
FIG. 1 shows an example engine system.

FIG. 1 shows a schematic depiction of an example engine system 100 including a multi-cylinder internal combustion engine 110 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air (MAF_1) can be directed to a compressor 122 of turbocharger 120 via a first branch of the intake passage 140 as indicated at 142 and at least a portion of the intake air (MAF_2) can be directed to a compressor 132 of turbocharger 130 via a second branch of the intake passage 140 as indicated at 144. Air entering intake passage 140 may be controlled via air intake system (AIS) throttle 102. The position of the AIS throttle can be adjusted by the control system via an AIS throttle actuator 104 communicatively coupled to control system 190.

The first portion of the total intake air (MAF_1) can be compressed via compressor 122 where it may be supplied to intake manifold 160 via intake air passage 146. Thus, intake passages 142 and 146 form a first branch of the engine's air intake system. Similarly, a second portion of the total intake air (MAF_2) can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 and/or an intake manifold temperature sensor 183, each communicating with control system 190. Intake passage 149 can include an air cooler 154 and/or a throttle 158. The position of the throttle can be adjusted by the control system via a throttle actuator 157 communicatively coupled to control system 190. As shown in FIG. 1, a first compressor recirculation valve (CRV1) 152 and a second compressor recirculation valve (CRV2) 153 may be provided to selectively recirculate intake air around the compressor stages of turbochargers 120 and 130 via recirculation passages 150, 151.

Engine 110 may include a plurality of cylinders two of which are shown in FIG. 1 as 20A and 20B. Note that in some examples, engine 110 can include more than two cylinders such as 3, 4, 5, 6, 8, 10 or more cylinders. These various cylinders can be equally divided and arranged in a vee configuration in-line with one of cylinders 20A and 20B. Cylinders 20A and 20B among other cylinders of the engine may be identical in some examples and include identical components. As such, only cylinder 20A will be described in detail. Cylinder 20A includes a combustion chamber 22A defined by combustion chamber walls 24A. A piston 30A is disposed within combustion chamber 22A and is coupled to a crank shaft 34 via a crank arm 32A. Crank shaft 34 may include an engine speed sensor 181 that can identify the rotational speed of crank shaft 34. Engine speed sensor 181 can communicate with control system 190 to enable a determination of engine speed. Cylinder 20A can include a spark plug 70A for delivering an ignition spark to combustion chamber 22A. However, in some examples, spark plug 70A may be omitted, for example, where engine 110 is configured to provide combustion via compression ignition. Combustion chamber 22A may include a fuel injector 60A, which in this example is configured as a port based fuel injector. However, in other examples, fuel injector 60A can be configured as a direct in-cylinder injector.

Cylinder 20A can further include at least one intake valve 40A actuated via an intake valve actuator 42A and at least one exhaust valve 50A actuated via an exhaust valve actuator 52A. Cylinder 20A can include two or more intake valves and/or two or more exhaust valves along with associated valve actuators. In this particular example, actuators 42A and 52A are configured as cam actuators, however, in other examples, electromagnetic valve actuators (EVA) may be utilized. Intake valve actuator 42A can be operated to open and close intake valve 40A to admit intake air into combustion chamber 22A via intake passage 162 communicating with intake manifold 160. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake passage 162 and products of combustion may be exhausted from combustion chamber 22A via exhaust passage 166.

It should be appreciated that cylinder 20B or other cylinders of engine 110 can include the same or similar components of cylinder 20A as described above. Thus, intake air may be supplied to combustion chamber 22B via intake passage 164 and products of combustion may be exhausted from combustion chamber 22B via exhaust passage 168. Note that in some examples a first bank of cylinders of engine 110 including cylinder 20A as well as other cylinders can exhaust products of combustion via a common exhaust passage 166 and a second bank of cylinders including cylinder 20B as well as other cylinders can exhaust products of combustion via a common exhaust passage 168.

Products of combustion that are exhausted by engine 110 via exhaust passage 166 can be directed through exhaust turbine 124 of turbocharger 120, which in turn can provide mechanical work to compressor 122 via shaft 126 in order to provide compression to intake air as described above. Alternatively, some or all of the exhaust gases flowing through exhaust passage 166 can bypass turbine 124 via turbine bypass passage 123 as controlled by wastegate 128. The position of wastegate 128 may be controlled by an actuator as directed by control system 190. For example, a solenoid valve may modulate pressure between that of the air in intake passage 142 arranged upstream of compressor 122 and that of the air in intake passage 149 arranged downstream of compressor 122.

Similarly, products of combustion that are exhausted by engine 110 via exhaust passage 168 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 168 can bypass turbine 134 via turbine bypass passage 133 as controlled by wastegate 138. The position of wastegate 138 may be controlled by an actuator as directed by control system 190.

In some examples, exhaust turbines 124 and 134 may be configured as variable geometry turbines, whereby associated actuators 125 and 135 may be used to adjust the position of the turbine impeller blades to vary the level of energy that is obtained from the exhaust gas flow and imparted to their respective compressor. For example, the control system can be configured to independently vary the geometry of the exhaust gas turbines 124 and 134 via their respective actuators 125 and 135.

In some embodiments, engine system 100 may include an exhaust gas (EGR) recirculation system. In the depicted example, engine system 100 may include a low-pressure EGR (LP-EGR) passage 108 for recirculating at least some exhaust gas from the exhaust passage 170, downstream of the turbine 124, to the intake passage 142, upstream of the compressor 122. LP-EGR passage 108 may include an LP-EGR valve 109 for controlling an EGR flow (i.e., an amount of exhaust gas recirculated) through the passage, as well as an EGR cooler 111 for lowering a temperature of exhaust gas flowing through the EGR passage before recirculation into the engine intake. Engine system 100 may additionally or alternatively include a high-pressure EGR (HP-EGR) passage 112 to recirculate exhaust gas from upstream of turbine 124 to the intake passage 146 downstream of compressor 122. The HP-EGR passage includes an HP-EGR valve 114 to control EGR flow through the passage. Further, while one branch of the engine intake system is depicted as receiving EGR, in some embodiments, an EGR system may be positioned to recirculate exhaust to the other branch of the engine intake system.

In some examples, engine system 100 also includes a crankcase ventilation system (CV) coupled to the engine intake to vent gasses from the crankcase in a controlled manner. During non-boosted conditions (when manifold pressure (MAP) is less than barometric pressure (BP)), the crankcase ventilation system draws air into crankcase 115 via a breather or vent tube 119. The crankcase ventilation system also vents gases out of the crankcase and into intake passage 144 via conduit 118 (herein also referred to as crankcase ventilation line 118). Conduit 118 is fluidically coupled to the crankcase 115 and intake passage 144 and, in some examples, may include a one-way CV valve 117 (that is, a passive valve that tends to seal when flow is in the opposite direction) to provide continual evacuation of crankcase gases from inside the crankcase 115 before connecting to the intake passage 144. However, in other examples conduit 118 may not include a one-way CV valve. In still other examples, the CV valve may be an electronically controlled valve that is controlled by controller 190.

The crankcase gases may include blow-by of combustion gases from the combustion chamber to the crankcase. Conduit 118 may include a uni-directional oil separator 116 which filters oil from vapors exiting crankcase 115 before they re-enter the intake passage 144. As such, the gases in the crankcase include un-burned fuel, un-combusted air, and fully or partially combusted gasses. Further, lubricant mist is also present. The oil separator 116 is intended to reduce exiting of the oil mist from the crankcase through the crankcase ventilation system. While not shown in FIG. 1, tube 119 may also include a uni-directional oil separator.

Based on engine operating conditions gas flow in conduit 118 may go in both directions, from crankcase 115 towards intake passage 144 and/or from intake passage 144 towards crankcase 115. For example, during non-boosted conditions where MAP is lower than BP, crankcase gases may flow through conduit 118 from crankcase 115 to intake passage 144, while air flows through the breather tube 119 from an intake passage to crankcase 115. This then flows from crankcase 115, through a CV valve into intake passage 149 to complete the circuit. In comparison, during boosted engine operation (when MAP is higher than BP), air may flow through conduit 118 from intake passage 144 to crankcase 115. However, in embodiments where conduit 118 includes a controllable CV valve, the valve may only allow flow in one direction (that is, of crankcase gases from the crankcase 115 to the intake passage 144) and disallow flow in the opposite direction (that is, of air from the intake passage 144 to the crankcase 115).

It will be appreciated that, as used herein, crankcase ventilation flow refers to the flow of gases through the crankcase ventilation line. This flow of gases may include a flow of intake air only, a flow of crankcase gases only, and/or a flow of a mixture of air and crankcase gases, the composition of the flow based at least on the direction of the flow as well as MAP conditions relative to BP at the time of flow.

As an example, while the engine is running under light load and moderate throttle opening, the intake manifold's air pressure may be less than crankcase air pressure. The lower pressure of the intake manifold draws fresh air towards it, pulling air through the crankcase vent tube, then through the crankcase (where it dilutes and mixes with combustion gases), through the PCV valve 119 in conduit 118, and into the intake manifold 160. As another example, when the engine is running boosted at high loads and larger throttle opening, the intake manifold's air pressure may be more than crankcase air pressure. The higher pressure of the intake manifold pushes fresh air towards conduit 118 then through the crankcase (where it dilutes and mixes with combustion gases) and into the breather tube.

FIG. 1 shows a single CV system positioned to direct crankcase ventilation flow to one branch of the intake system. As illustrated, the crankcase ventilation flow is directed to intake passage 144, which is part of the second branch of the intake system. However, in some embodiments, a second CV system may be present to additionally or alternatively direct crankcase ventilation flow to the first branch of the intake system. Further, in some embodiments, the CV system may direct crankcase ventilation flow to a portion of the intake system downstream of where the first and second branches combine.

Products of combustion exhaust by one or more cylinders via exhaust passage 166 can be directed to ambient via exhaust passage 170. Exhaust passage 170 may include an exhaust aftertreatment device such as catalyst 174, and one or more exhaust gas composition sensors indicated at 184 and 185, for example. Similarly, products of combustion exhaust by one or more cylinders via exhaust passage 168 can be directed to ambient via exhaust passage 172. Exhaust passage 172 may include an exhaust aftertreatment device such as catalyst 176, and one or more exhaust gas sensors indicated at 186 and 187, for example. Exhaust gas sensors 184, 185, 186, and/or 187 can communicate with control system 190.

Engine system 100 can include various other sensors. For example, at least one of intake passages 142 and 144 can include mass air flow sensors 180 and 181. In some examples, only one of intake passages 142 and 144 can include a mass air flow sensor. In still other examples, both of intake passages 142 and 144 can include a mass airflow sensor. A mass airflow sensor may include, as one example, a hot wire anemometer or other suitable device for measuring mass flow rate of the intake air. Mass airflow sensor 180, 181 can communicate with control system 190 as shown in FIG. 1.

A humidity sensor 106 is provided in engine system 100 in intake passage 142. In some examples, the humidity sensor 106 may measure the relative humidity and temperature of the gas that the sensor is exposed to. Based on the relative humidity and temperature, the specific humidity of the gas may be determined (e.g., the amount of water per unit mass of gas flow). To measure the relative humidity, a dew point sensor (using a chilled mirror, for example) or a wet bulb or dry bulb sensor may be used. In other examples, the absolute humidity may be measured by a capacitance sensor, and the temperature and/or pressure of the air estimated or measured in order to calculate the relative and/or specific humidity. In the example illustrated in FIG. 1, the humidity sensor 106 is located in the non-PCV branch of the intake system, e.g., in intake passage 142 rather than in intake passage 144 or in combined intake passage 149. By positioning the humidity sensor in the intake system where it is not exposed to crankcase gas, the humidity of the intake air may be accurately determined. However, in some examples, the humidity sensor may be located in other positions in the engine system 100, such as in intake passage 144, combined intake passage 149, intake manifold 160, etc.

Output from humidity sensor 106 may be used to adjust one or more engine operating parameters, such as the amount of EGR (LP and/or HP) directed to the engine. For example, EGR lowers the oxygen content of the cylinder charge, which may lead to combustion stability issues. If humidity is high, combustion issues may be further exacerbated, and thus EGR levels may be controlled based on intake air humidity. Other parameters that may be adjusted based on humidity include spark timing, air-fuel ratio, and other parameters.

Additionally, an intake gas composition sensor 192 is provided in the air intake system downstream of humidity sensor 106. As illustrated, intake gas composition sensor 192 is positioned in common intake passage 149 upstream of air cooler 154. By positioning the intake gas sensor upstream of the air cooler, water vapor from the cooler, which may affect the oxygen reading of the sensor, is not seen by the sensor. However, in some embodiments the intake gas sensor may be positioned downstream of the cooler. Intake gas sensor 192 may determine the concentration of oxygen in the intake air, for example. Intake gas sensor 192 may be a wideband oxygen sensor in one example, or a narrowband oxygen sensor in another example.

Output from the intake gas composition sensor 192 may be used as a rationality check to determine the functionality of the humidity sensor 106 under some conditions. As will be described in more detail below with respect to FIGS. 2-3, when the humidity sensor detects a large change in humidity, such as when a vehicle in which the engine system 100 is installed enters a rain shower, the change in humidity may be compared to the intake gas composition sensor output. If the change in humidity correlates to the change in intake oxygen detected by the intake gas composition sensor, it may be determined that the humidity sensor is functioning as intended. However, if the humidity sensor output does not correlate to the intake gas sensor output, degradation of the humidity sensor may be indicated.

For example, a high level of humidity may reduce the oxygen content of the intake air by an amount large enough to be detected by the intake gas sensor. Thus, when humidity as measured by the humidity sensor increases, the oxygen content of the intake air measured by the intake gas sensor will decrease if both sensors are functioning properly. Conversely, when humidity decreases, the oxygen content of the intake air will increase. If the humidity sensor detects a large change in humidity, but the intake gas composition sensor detects no change or a change in the wrong direction of the intake oxygen concentration, the humidity sensor may be determined to be degraded. In another example, if the intake air oxygen concentration increases or decreases and the humidity sensor output remains the same, the humidity sensor may be degraded. The intake gas composition sensor measures the partial pressure of oxygen, which is also dependent on total intake air pressure. As such, the output of the intake gas composition sensor may be corrected based on the intake air sensor. Further, the presence of other oxidants and reductants may affect the intake gas composition reading.

Further, in some examples, when crankcase pressure exceeds the compressor inlet pressure, the humidity from the crankcase gasses is directed to the second branch of the intake system (e.g., intake passage 144). However, the humidity sensor is positioned in the other branch, and thus does not measure the humidity resulting from the crankcase gases. In the arrangement illustrated in FIG. 1, the crankcase pressure is near compressor inlet pressure. However, other arrangements are possible wherein the crankcase pressure is near barometric pressure. Control system 190 can include one or more controllers configured to communicate with the various sensors and actuators described herein. As one example, control system 190 can include at least one electronic controller comprising one or more of the following: an input/output interface for sending and receive electronic signals with the various sensors and actuators, a central processing unit, memory such as random accessible memory (RAM), read-only memory (ROM), keep alive memory (KAM), each of which can communicate via a data bus. Control system 190 may include a proportional-integral-derivative (PID) controller in some examples. However, it should be appreciated that other suitable controllers may be used as can be appreciated by one skilled in the art in light of the present disclosure. The controller may store instructions that may be executed in order to carry one or more control routines, such as the control routine described herein with respect to FIG. 2.

Control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system. Thus, at least the spark timing, valve timing, and fuel injection timing can be actuated by the control system.

Figure 2:
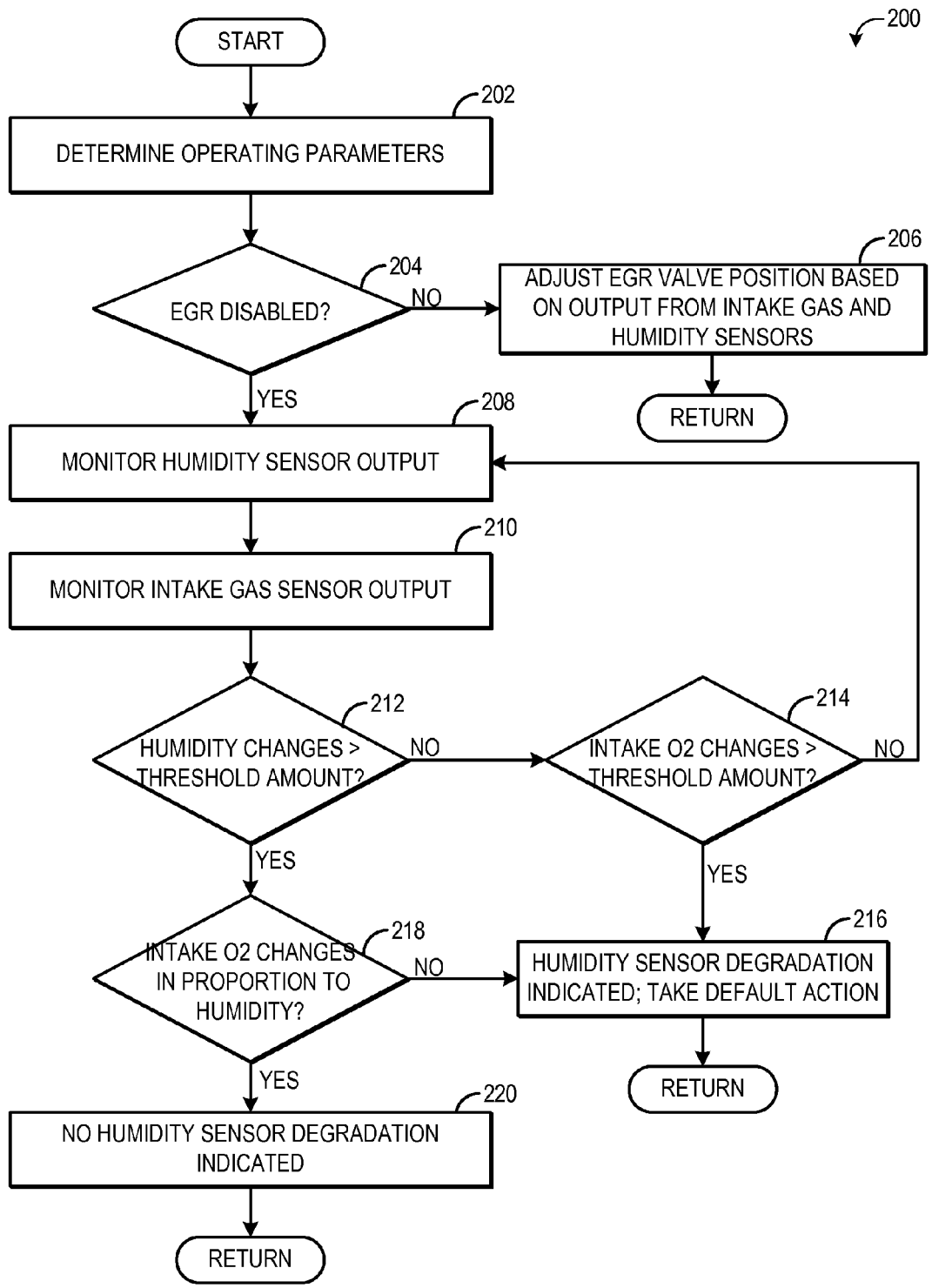
FIG. 2 shows a flow chart illustrating a method for testing a humidity sensor according to an embodiment of the present disclosure.

Turning to FIG. 2, a method 200 for testing a humidity sensor is illustrated. Method 200 may be carried out by an engine control system, such as control system 190, to test a humidity sensor (e.g., sensor 106) using correlation to output from an intake gas composition sensor (e.g., sensor 192). As used herein, correlation may refer to a change in humidity sensor output that is reflected in the intake gas composition sensor output. The correlation may be inverse in one example, wherein humidity sensor output increases (e.g., measured humidity increases) while intake gas composition sensor output decreases (e.g., measured intake oxygen concentration decreases). The change in humidity sensor output may be proportional to the change in intake gas sensor composition output, but may not be equal to the change in intake gas sensor output.

At 202, method 200 includes determining engine operating parameters. The operating parameters may include but are not limited to the amount of EGR flowing to the engine intake, humidity sensor output, intake gas sensor output, engine speed, engine load, air-fuel ratio, and other parameters. At 204, method 200 includes determining if EGR is disabled. EGR may be disabled during idle engine conditions, for example, in order to maintain combustion stability. If EGR is disabled, the EGR valve positioned in the EGR passage and configured to control the amount of EGR flowing to the engine may be fully closed, and thus EGR status may be determined based on the position of the EGR valve.

If EGR is enabled, that is, if at least some EGR is flowing to the engine and/or the EGR valve is in a partially or fully open position, method 200 proceeds to 206 to adjust the position of the EGR valve based on output from the intake oxygen sensor and further based on output from the humidity sensor. The amount of EGR currently flowing to the engine may be determined based on the intake oxygen concentration, as EGR reduces the amount of oxygen in the intake air. If a desired amount of EGR (determined based on operating parameters such as engine speed and load) is different from the measured EGR amount, the EGR valve is adjusted to provide the desired amount of EGR. Further, as explained previously, the amount of humidity in the intake air may affect combustion, and thus the amount of EGR directed to the engine may be adjusted based in part on the humidity of the intake air as measured by the humidity sensor. For example, if humidity is high (e.g., 100%), the amount of EGR directed to the engine may be lower than when humidity is low (e.g., 50%). Method 200 then returns.

If EGR is disabled, a humidity sensor test may be performed in order to determine if the humidity sensor is degraded. The sensor test includes correlating humidity measurements from the humidity sensor with the amount of intake oxygen measured by the intake gas sensor. Because the intake gas sensor is positioned in the intake system downstream of the EGR outlet (for both LP and HP EGR), if EGR is flowing to the engine, it may result in an intake air oxygen concentration that is lower than the oxygen concentration of the intake air flowing past the humidity sensor. Thus, in some examples, the test may be performed only when EGR is disabled or is less than a threshold amount. In some embodiments, the humidity sensor test may be performed when EGR is disabled due to engine conditions (such as when the engine is at idle). In other embodiments, the controller may actively disable EGR, even when engine conditions indicate EGR is to be on, in order to perform the humidity sensor test.

Returning to 204, it is determined that EGR is disabled, method 200 proceeds to 208 to monitor humidity sensor output. The humidity sensor output may be monitored in order to identify when a large change in humidity has been detected by the humidity sensor. At 210, the intake gas sensor output is monitored. At 212, it is determined if humidity has changed by more than a threshold amount. The change in humidity may be a change in humidity greater than a threshold amount. For example, if an initial humidity reading is 10% smaller than a subsequent humidity reading, the humidity may have changed by more than a threshold amount. When referring to humidity, it is to be understood that humidity may be expressed as relative humidity, specific humidity, or absolute humidity. However, if specific humidity is used, other factors that may affect the humidity reading, such as temperature, may not be used in the humidity calculation, and thus the specific humidity may have a higher correlation to the intake gas composition sensor reading.

If the humidity sensor output remains relatively stable and does not change by more than a threshold amount, method 200 proceeds to 214 to determine if the intake gas composition sensor output has changed by a more than a second threshold amount. The second threshold amount may be an amount that is proportional to the first threshold amount of the humidity change. For example, one-fifth of the change in the non-condensing water concentration of the intake air (as detected by the humidity sensor) may be reflected by the intake gas composition sensor if the sensors are not degraded. Thus, if the first threshold amount is 10%, the second threshold amount may be 2%. If the intake gas sensor output changes by more than a second threshold amount while the humidity sensor does not change by more than the first threshold amount, degradation of the humidity sensor is indicated at 216, and default action is taken. The default action taken in response to degradation of the humidity sensor may include notifying a vehicle operator, by lighting a malfunction indicator lamp and/or setting a diagnostic code, for example. Additionally, rather than adjust EGR valve position based on output from the humidity sensor, the EGR valve position may be based on a default humidity value, such as 100% relative humidity. This may result in reduced desired EGR levels (reduced LP-EGR, reduced HP-EGR, or both).

If the output of the intake gas composition sensor is also relatively constant, e.g., does not change by more than 1%, method 200 loops back to 208 to continue to monitor for a change in either humidity sensor output or intake gas composition sensor output. In this way, if the humidity sensor measures relatively constant humidity yet the intake gas sensor measures changing intake oxygen concentration, it may be determined that the humidity sensor is "stuck" and not measuring changes in humidity.

However, depending on the presence and/or configuration of the crankcase ventilation system, the intake gas composition sensor may be exposed to air having a different humidity than the intake air that the humidity sensor is exposed to. For example, in the engine system illustrated in FIG. 1, during boosted conditions, air from the crankcase may be directed to the intake passage of one branch of the two-branch intake system, while the humidity sensor is located on the other branch. Thus, during boosted conditions, the humidity sensor is not exposed to the crankcase gasses, but the intake gas composition sensor is exposed to the crankcase gases, as it is located downstream of the crankcase ventilation inlet. Because the crankcase gases may of relatively high humidity, if conditions are present where the crankcase gases are exposed to the intake gas composition sensor but not the humidity sensor (e.g., during boosted conditions or when crankcase pressure is greater than compressor inlet pressure), the change in intake gas oxygen concentration attributed to the humidity of the intake air may be adjusted to account for the humidity in the intake air resulting from the crankcase gases.

Returning to 212, if it is determined that humidity has changed by more than the first threshold amount, method 200 proceeds to 218 to determine if the intake gas sensor output has changed in proportion to the change in humidity sensor output. For example, if the humidity of the intake air increases, the oxygen concentration of the intake air will decrease. Thus, when the humidity sensor indicates an increase in humidity, the intake gas sensor should indicate a decrease in intake air oxygen concentration. Similarly, if the humidity sensor indicates humidity has decreased, the intake gas sensor should indicate that intake air oxygen concentration has increased. As discussed above, this assumes that crankcase gases are not flowing past the intake gas composition sensor. If crankcase gases from the crankcase ventilation system are flowing past the intake gas composition sensor but not the humidity sensor, the intake air oxygen concentration as determined by the intake gas composition sensor may be adjusted to account for the crankcase gases.

If the intake gas sensor output has not changed in proportion to the change in humidity sensor output, method 200 proceeds to 216 to indicate humidity sensor degradation and take default action, as explained above. If the intake gas sensor output has changed in proportion to the humidity sensor output, method 200 proceeds to 220 to indicate no degradation of the humidity sensor, and then method 200 returns.

In the examples described above, the change in humidity being proportional to the change in intake oxygen is described using relative percentage amounts of change (for example, a 10% chance in humidity is proportional to a 2% change in intake oxygen concentration). However, the humidity and intake oxygen may be proportional in other amounts. Other suitable mechanisms of correlating the change in humidity to the change in intake oxygen concentration may include a map stored in the controller that lists intake oxygen concentration as a function of intake humidity, where actual measured values of intake humidity may be used to look up a corresponding expected intake oxygen concentrations. If the expected intake oxygen concentration is different than the measured intake oxygen concentration, the humidity sensor may be degraded.

Thus, the functionality of an intake system humidity sensor may be determined based on correlation to the intake air oxygen concentration, as measured by an intake gas sensor, when EGR is off, for example only when EGR is off. Changes in humidity of the air flowing past the intake gas sensor will result in changes to the oxygen concentration of the intake air, and thus if a change in humidity is detected but not a corresponding change in oxygen concentration, the humidity sensor may be degraded. The corresponding change in oxygen concentration may be an inverse correlation. For example, if the humidity sensor is not degraded, a decrease in measured humidity will result in an increase in measured oxygen concentration, while an increase in measured humidity will result in a decrease in measured oxygen concentration.

Figure 3:
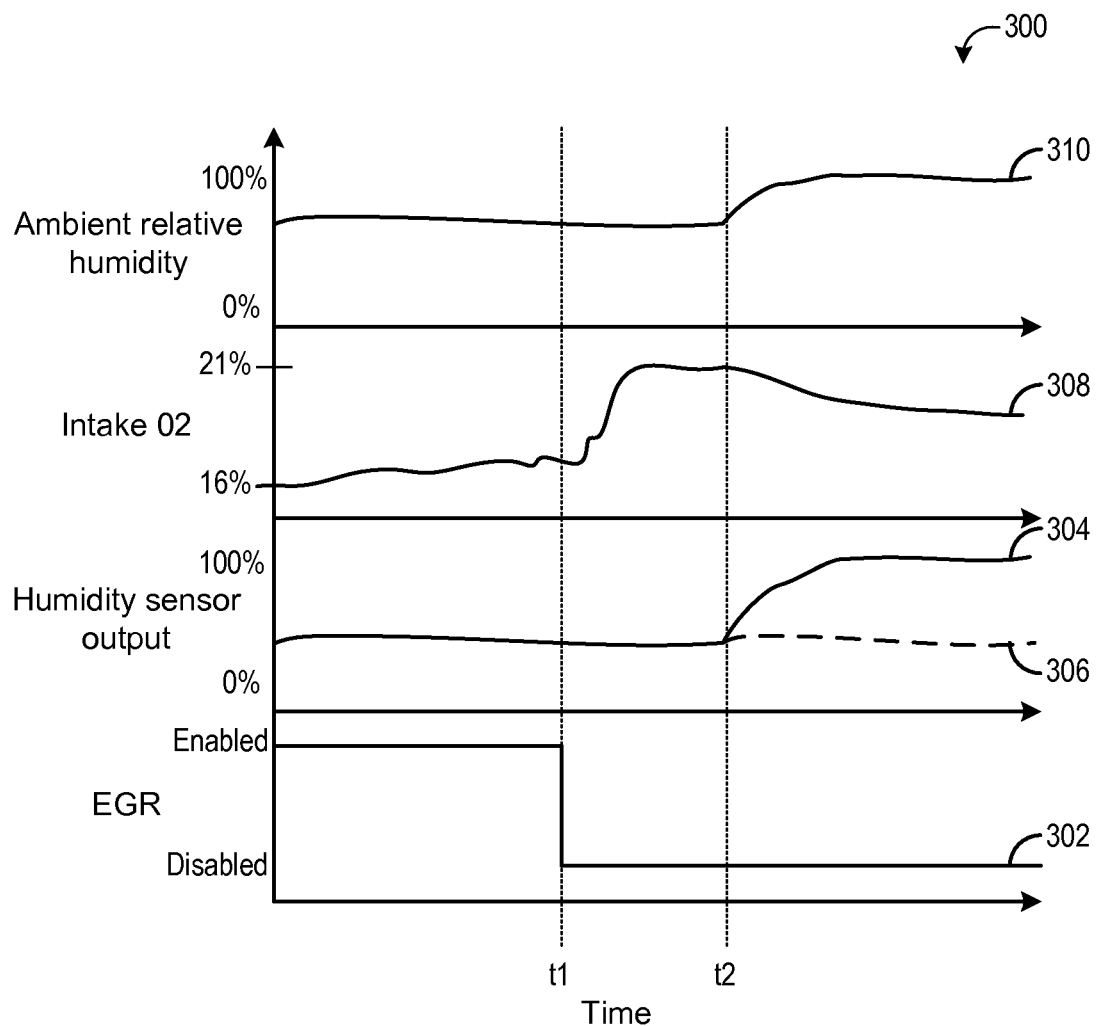
FIG. 3 shows a diagram illustrating parameters of interest during the humidity sensor test according to an embodiment of the present disclosure.

FIG. 3 is a diagram 300 showing parameters of interest during a test of a humidity sensor. For each parameter illustrated, time is depicted along the horizontal axis, and each respective parameter value is depicted along the vertical axis. Prior to time t1, EGR is flowing, as shown by curve 302. The humidity sensor is detecting a humidity of approximately 60%, as illustrated by curve 304. Intake oxygen concentration, as measured by the intake gas composition sensor and illustrated by curve 308, is relatively low owing to the presence of EGR in the intake air, which lowers the oxygen concentration of the intake air. For example, the intake oxygen concentration is approximately 16%. (This is corrected to what the partial pressure of oxygen would be if the total pressure at the measurement site is at standard temperature and pressure.)

At time t1, EGR is disabled. This may occur if the engine is in idle, or if the EGR is actively disabled in order to perform the humidity sensor test. As a result, the oxygen concentration of the intake air increases to approximately 21%. At time t2, the ambient humidity of the air surrounding the engine increases from 60% to 100%, as shown by curve 310. This may occur if the vehicle in which the car is installed enters a car wash or encounters a rain shower. As a result of the increase in humidity, the intake oxygen concentration decreases, for example to 17%.

To determine if the humidity sensor is degraded, the humidity measured by the humidity sensor is correlated to the intake air oxygen concentration. As shown by curve 304, when the humidity sensor is functioning and not degraded, the humidity of the intake air as measured by the humidity sensor increases to 100%. However, as shown by curve 306, when the humidity sensor is degraded, the humidity measured by the sensor does not increase to 100%. Rather, in the example illustrated in FIG. 3, the humidity remains at 60%. However, because the intake oxygen concentration, as measured by the intake gas composition sensor, decreases, the humidity sensor will be determined to be degraded if it does not indicate an increase in humidity. Thus, by correlating intake air humidity to intake air oxygen concentration, functionality of the humidity sensor may be determined.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
indicating degradation of a humidity sensor based on an output from the humidity sensor and an output from an intake gas composition sensor, wherein output from the intake gas composition sensor comprises an indication of intake air oxygen concentration.

2. The method of claim 1, wherein indicating degradation of the humidity sensor based on the output from the humidity sensor and the output from the intake gas composition sensor further comprises indicating degradation of the humidity sensor based on the output from the humidity sensor and the output from the intake gas composition sensor while exhaust gas recirculation (EGR) is off and responsive to output from the humidity sensor changing more than a threshold amount.

3. The method of claim 2, wherein indicating degradation of the humidity sensor based on the output from the humidity sensor and the output from the intake gas composition sensor further comprises, if the output from the humidity sensor decreases by more than the threshold amount, indicating degradation of the humidity sensor if the output from the intake gas composition sensor does not increase above a second threshold amount.

4. The method of claim 2, wherein indicating degradation of the humidity sensor based on the output from the humidity sensor and the output from the intake gas composition sensor further comprises, if the output from the humidity sensor increases by more than the threshold amount, indicating degradation of the humidity sensor if the output from the intake gas composition sensor does not decrease below a second threshold amount.

5. The method of claim 2, further comprising, if humidity sensor degradation is not indicated, adjusting an amount of EGR based on the output from the humidity sensor during a subsequent operation when EGR is on.

6. The method of claim 1, wherein the intake gas composition sensor is positioned downstream of the humidity sensor.

7. A system, comprising:
an exhaust gas recirculation (EGR) system;
a humidity sensor disposed in an engine intake system;
an intake gas composition sensor disposed in the engine intake system downstream of the humidity sensor; and
a controller including instructions to:
when EGR is disabled and if output from the humidity sensor changes by more than a threshold amount, indicate humidity sensor degradation based on the humidity sensor output and output from the intake gas composition sensor.

8. The system of claim 7, wherein the controller is configured to disable EGR during idle engine operation.

9. The system of claim 7, wherein the controller is configured to disable EGR in response to a humidity sensor test cycle.

10. The system of claim 7, wherein if the output from the humidity sensor increases by more than the threshold amount, the controller includes instructions to indicate humidity sensor degradation if output from the intake gas composition sensor is less than a second threshold amount.

11. The system of claim 7, wherein if the output from the humidity sensor decreases by more than the threshold amount, the controller includes instructions to indicate humidity sensor degradation if output from the intake gas composition sensor is greater than a second threshold amount.

12. The system of claim 7, wherein the intake gas composition sensor measures intake air oxygen concentration.

13. The system of claim 7, wherein the controller includes instructions to, when EGR is enabled, adjust an amount of EGR directed to the engine intake system based on the output of the humidity sensor.

14. The system of claim 7, wherein the humidity sensor is located in a first intake passage of the engine intake system, and further comprising a positive crankcase ventilation conduit coupling a crankcase of an engine to a second intake passage of the engine intake system.

15. A method comprising:
when exhaust gas recirculation (EGR) is enabled, adjusting an amount of EGR directed to an engine intake based on intake air humidity measured by a humidity sensor; and
when EGR is disabled, indicating humidity sensor degradation if measured intake air humidity does not correlate to measured intake air oxygen concentration.

16. The method of claim 15, wherein indicating humidity sensor degradation further comprises, if the measured intake air humidity increases and the measured intake air oxygen concentration does not decrease, indicating humidity sensor degradation.

17. The method of claim 15, wherein indicating humidity sensor degradation further comprises, if the measured intake air humidity decreases and the measured intake air oxygen concentration does not increase, indicating humidity sensor degradation.

18. The method of claim 15, wherein adjusting the amount of EGR based on intake air humidity includes decreasing the amount of EGR as intake air humidity increases.

* * * * *